United States Patent
Nitsch

(10) Patent No.: US 7,310,366 B2
(45) Date of Patent: *Dec. 18, 2007

(54) PROCEDURE FOR ESTIMATING AMPLIFICATION FACTORS OF A CDMA SIGNAL

(75) Inventor: Bernhard Nitsch, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 745 days.

This patent is subject to a terminal disclaimer.

(21) Appl. No.: 10/368,797

(22) Filed: Feb. 19, 2003

(65) Prior Publication Data

US 2003/0156628 A1 Aug. 21, 2003

(30) Foreign Application Priority Data

Feb. 19, 2002 (DE) ................................. 10206966

(51) Int. Cl.
*H04B 1/707* (2006.01)

(52) U.S. Cl. ................. 375/147; 375/150; 375/240.18; 375/130; 375/140; 375/316; 370/342; 370/335; 370/529

(58) Field of Classification Search ................ 375/147, 375/150, 240.18, 130, 140, 345, 316; 370/342, 370/335, 529
See application file for complete search history.

(56) References Cited

U.S. PATENT DOCUMENTS 5,568,519 A * 10/1996 Baier et al. .................. 375/343

2001/0014114 A1 * 8/2001 Baltersee et al. ........... 375/148
2003/0053490 A1 * 3/2003 Nitsch ......................... 370/529
2003/0081585 A1 * 5/2003 Nitsch et al. ............... 370/342

FOREIGN PATENT DOCUMENTS

| DE | 41 21 356 C2 | 1/1993 |
|---|---|---|
| DE | 43 29 320 A1 | 3/1995 |
| DE | 44 41 543 A1 | 5/1995 |
| DE | 196 23 665 C1 | 4/1997 |

OTHER PUBLICATIONS

Klein et al., "Zero Forcing and Minimum Mean-Square-Error Equalization for Multiuser Detection in Code-Division Multiple-Access Channels," *IEEE Transactions on Vehicular Technology*, vol. 45, No. 2, pp. 276 to 287 (May 1996).

(Continued)

*Primary Examiner*—Chieh M. Fan
*Assistant Examiner*—Siu M Lee
(74) *Attorney, Agent, or Firm*—Caesar, Rivise, Bernstein, Cohen & Pokotilow, Ltd.

(57) ABSTRACT

The invention concerns a procedure for estimating unknown amplification factors of a received CDMA signal, which encompasses a plurality of code channels, in which respectively an input signal from a symbol plane is split on a symbol plane through splitting with a split code $(\omega_a^b(v))$ in a chip plane. The procedure is executed in the following steps: formation of a cost function dependent upon estimated values of all unknown amplification factors, partial differentiation of the cost function according to estimated value of the unknown amplification factors, formation of a matrix-vector-equation on the basis that all partial differentials of the cost function are zero and thus a minimum of the cost function is present, and the computation of at least some of the matrix coefficients of the matrix-vector-equation with a correlation function on the symbol plane.

8 Claims, 2 Drawing Sheets

OTHER PUBLICATIONS

Steiner et al., "Low Cost Channel Estimation in the Uplink Receiver of CDMA Mobile Radio Systems," *Frequenz* 47:11-12, pp. 292 to 297, (1993).

Tang et al., "Closed-Form Analysis of Linearly Constrained CMA-Based Blind Multiuser Detector," *IIEE Communications Letters*, vol. 4, No. 9, pp. 273 to 276 (Sep. 2000).

Kammeyer, *Informationstechnik*, pp. 458-463 and 639-649 (1996).

* cited by examiner

PROCEDURE FOR ESTIMATING AMPLIFICATION FACTORS OF A CDMA SIGNAL

BACKGROUND OF THE INVENTION

The invention concerns a procedure for the estimation of amplification factors of a Code Division Multiple Access signal (hereinafter, CDMA signal).

In the case of CDMA signals, a plurality of code channels, which is split respectively into different orthogonal split codes, is simultaneously transmitted. Following the splitting, a scrambling is carried out in accord with a scrambling code. In accord with the CDMA2000-Standard, many code sets are available, whereby, the various code sets are scrambled in a uniform scrambling code within a code set. Since the scrambling codes are not orthogonal to one another, the said code sets are not completely separated from each other. The CDMA2000-Standard copes with this disadvantage by recognizing an increase in the transmission capacity.

In a measuring device, which receives a transmitted CDMA signal through a distorted transmission channel, such as a radio channel, an estimation of the amplification factors of the code channel is to be undertaken. In other words, an estimation of the amplification factors is necessary for interpreting a received CDMA signal. With the CDMA2000-Standard, this estimation is involved with a high expenditure in time and expense, since, because of the incomplete orthogonality, the capacities of a specific code channel in other code channels diminish. This brings about an increased numerical complexity.

As to the state of the technology, reference is made to DE 199 53 349 A1. This document discloses a procedure for the synchronization of a CDMA received signal by the formation of correlation-values on a chip plane. However, the computation of amplification factors of the received CDMA signal is not confronted in this said document.

SUMMARY OF THE INVENTION

Thus, the invention has the purpose of creating a procedure for the estimation of amplification factors of a CDMA signal and also establishing a corresponding computer program, which has a small implementation expenditure, that is to say, requires a short time for computation.

Accordingly, the invention provides a process for estimating amplification factors $(g_a^{(b)})$ of a received CDMA Signal (r(v)), said CDMA signal including a plurality of code channels, in which, respectively, an incoming signal $(s_a^{(b)}(l))$ of a symbol plane with a splitter code $(w_a^{(b)}(v))$ is split into a chip plane, said process comprising the following steps:

formation of a cost function (L) dependent upon estimated values $(\hat{g}_a^{(b)})$ of all the amplification factors $(\hat{g}_a^{(b)})$, partial differentiation of the cost function (L) according to the estimated value $(\hat{g}_a^{(b)})$ of the amplification factors $(\hat{g}_a^{(b)})$, formation of a matrix-vector-equation based on all partial differentials of the cost function (L) being zero and thus a minimum of the cost function being present, and computation of at least some of the matrix coefficients $(A_{a,\mu}^{(b,\lambda)})$ of the matrix-vector-equation with a correlation function on the symbol plane.

Also provided are computer programs and digital storage media for performing the process of the invention.

The invention takes cognizance, that the computation of the matrix coefficients of the matrix vector equation, which is attained through partial differentiation of a cost-function, is executed with greater effectiveness on the symbol plane instead of on the chip plane.

The intermediate value coefficients arrived at by the computation of matrix coefficients can either be calculated a priori and stored, or, by the use of a recombination system, especially with a Hadamard-transformation, these can be computed aposteriori.

BRIEF DESCRIPTION OF THE DRAWINGS

An embodiment example of the invention, in the following, is more closely described with the aid of reference to the drawing. The drawing shows.

DETAILED DESCRIPTION OF PREFERRED EMBODIMENTS

In the following, the invented procedure, is described in greater detail with the aid of an executed example. In the following mathematical presentation, the following symbols have been employed:

| | |
|---|---|
| $\epsilon$ | Time Offset |
| $\hat{\epsilon}$ | Estimated value of the time offset |
| $\Delta\omega$ | Estimated value of the frequency offset; |
| $\Delta\phi$ | Phase offset; |
| $\Delta\hat{\phi}$ | Estimated value of the phase offset; |
| v | Time index on the chip surface; |
| $\lfloor x \rfloor$ | An operator, which determines the next smaller, whole number of the fraction number x |
| a | The number of a code channel; |
| CC | Code class of a splitting code; |
| CN | Code number of a splitting code; |
| b | Number of a code set; |
| $g_a^{(b)}$ | Amplification factor of the a-code channel in the b-code set; |
| $\hat{g}_a^{(b)}$ | Estimated value of the amplification factor of the a-code channel in the b-code set |
| HADAMARD{y,x} | Coefficients from the y-line and the x-column of a Hadamard matrix; |
| j | Square root of −1; |
| l | Time index of symbol plane; |
| n(v) | Disturbance; |
| r(v) | Scrambled measurement signal; |
| REAL{...} | Real component operator; |
| REM{...} | Operator, which computes the whole number remainder of a division; |
| $s_a^{(b)}(v)$ | Capacity normalized, scrambled, undistorted reference signal of the a-code channel in the b-code set; |
| $s^{(b)}(v)$ | scrambled reference signal of the b-code set; |
| $scr^{(b)}$ | Scrambling code of the b-code set; |
| $SF_a^{(b)}$ | Splitting factor of the splitting code of the a-code channel in the b-code set; |
| $w_a^{(b)}(v)$ | Splitting code of the a-code channel in the b-code set; |
| $w_{CC}^{CN}(v)$ | Splitting code in the code class CC with the code number CN |

In the following, the invented estimation procedure for the estimation of unknown parameters in a CDMA signal is described, which procedure is carried out with a low amount of numerical complexity. This procedure is, for example, useable with the CDMA2000 mobile radio system and universally applicable to all mobile radio systems, which, besides orthogonal splitting codes employ also non-orthogonal splitting codes for the separation of code channels.

Figure 1:
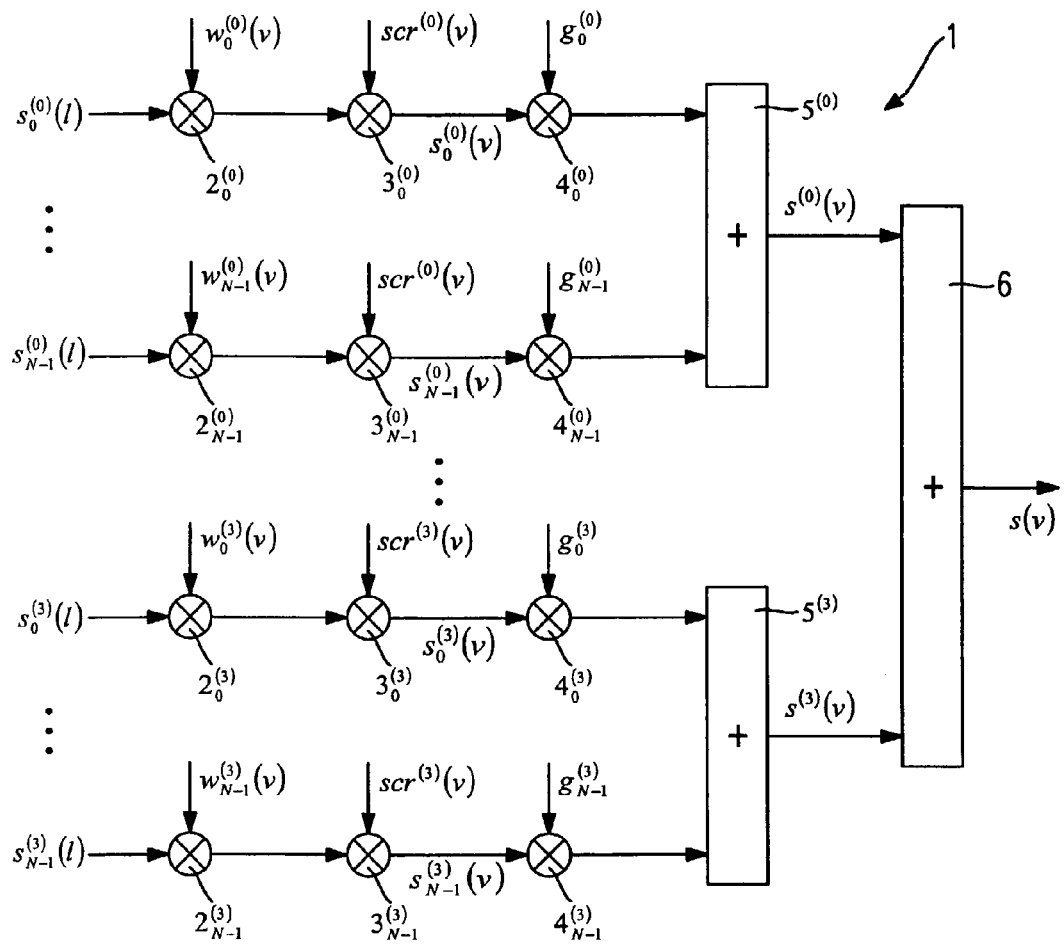
FIG. 1 a block circuit diagram of the sender module which is the basis of the invented procedure, FIG. 2 a block circuit drawing of the transmission channel model which is the basis of the invented procedure, FIG. 3 a schematic presentation of the matrix of an equation system, which is obtained through the linearization of a cost function, and FIG. 4 a schematic presentation, as to how, in the computation of the matrix coefficients, needed intermediate-value coefficients arise from the split symbols of the products of the scrambling codes.

In FIG. 1, the block circuit diagram of a sender 1 of the CDMA2000 Mobile radio system is schematically presented. The standardized capacity symbol $s_a^{(b)}(l)$ of the various code channels a in the different code sets b are separated by means of orthogonal splitting codes (Walsh-codes) $w_a^{(b)}(v)$. For this, splitter-apparatuses $2_a^{(b)}$ are available. Thereafter, the code channels from each code set are scrambled with a scrambling code $scr^b v$ in a scrambling apparatus $3_a^{(b)}$, and form the scrambled, capacity standardized reference signals $s_a^{(b)}(v)$ of the code channels. The scrambling codes $scr^b v$ of different code sets are not orthogonal to one another. Each code channel is amplified with a different amplification factor, namely $g_a^{(b)}$, which is indicated in FIG. 1 by the multiplier $4_a^{(b)}$. The sum formed in the additives $5_a^{(b)}$ which represents all amplified, scrambled reference signals of the code sets b, in the scrambled reference signal $s^{(b)}(v)$ of this code set b. The sum acquired in the addition 6 of all scrambled reference signals of the code sets form the scrambled reference signal $s(v)$.

Figure 2:
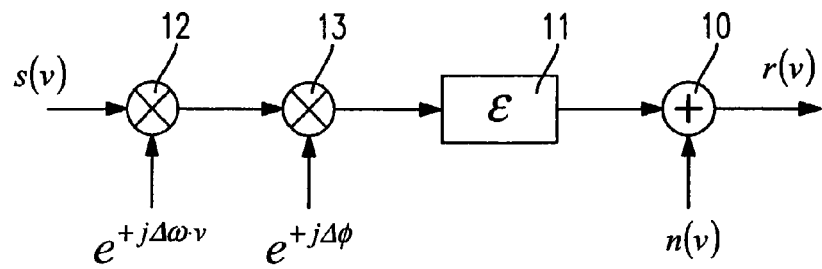

The channel model of the transmission channel, as this is schematically depicted in FIG. 2, takes into consideration:

an auxiliary additive disturbance $n(v)$ to a single addition 10, a time offset $\epsilon$ in a delay element 11, a single multiplier 12 as the factor $e^{j\Delta\omega v}$ for frequency offset $\Delta\omega$, and a phase offset $\Delta\phi$ incorporated in a single multiplier 13 as factor $e^{j\Delta\phi}$, which influence the scrambled reference signal and are reflected in the receiver side measured signal $$r(v)=s(v+\epsilon)\cdot e^{+j\Delta\omega(v+\epsilon)}\cdot e^{+j\Delta\phi}+n(v) \quad (1)$$

The numerically effective, invented procedure for the common estimation of all unknown parameters is introduced in the following as an example of the CDMA2000 mobile radio system, which employs three code sets. For the determination of this mobile radio standard, please refer to 3GPP2, "Recommended Minimum Performance Standards for CDMA2000 High Rate Packet Data Access Network" (3GPP2, C.P9011), 3GPP2, Dec. 14, 2000. In general the procedure, however, can be used for mobile radio systems of other standards, with more or fewer code sets.

For a multi-user estimation of all unknown parameters, that is, the offsets of time $\epsilon$, frequency $\Delta\omega$, phase $\Delta\phi$ and the amplification factors $g_a^{(b)}$ of the code channel a in the different code sets b, a "maximum likelihood" estimator is employed, which makes use of the following cost function:

$$L_1(\Delta\tilde{\omega}, \Delta\tilde{\phi}, \tilde{\epsilon}, \tilde{g}_a^{(b)}) = \sum_{v=0}^{N-1} \left| r(v-\tilde{\epsilon})\cdot e^{-j\Delta\tilde{\omega}v}\cdot e^{-j\Delta\tilde{\phi}} - \sum_{b=0}^{3}\sum_{a=0}^{N^{(b)}-1} \tilde{g}_a^{(b)}\cdot s_a^{(b)}(v) \right|^2 \quad (2)$$

Wherein, $s_a^{(b)}(v)$ represents the complex valued, scrambled, capacity standardized, undistorted Reference signal of the a-code channel in the b-code set, and $g_a^{(b)}$ represents the amplification factor of the a-code channel in the b-code set.

For the minimizing of the cost function $L_1$, this is linearized, in that a series development of the first order of the exponential function as well as a series development of the first order of the measurement signal $r(v)$ is used. This yields:

$$L(\Delta\tilde{\omega}, \Delta\tilde{\phi}, \tilde{\epsilon}, \tilde{g}_a^{(b)}) = \sum_{v=0}^{N-1} \left| r(v) - jr(v)\cdot\Delta\tilde{\omega}\cdot v - jr(v)\cdot\Delta\tilde{\phi} - r'(v)\cdot\tilde{\epsilon} - \sum_{b=0}^{3}\sum_{a=o}^{N^{(b)}-1} \tilde{g}_a^{(b)}\cdot s_a^{(b)}(v) \right|^2, \quad (3)$$

The cross-terms between the unknown parameters are disregarded, so that the minimizing of the linearized cost function L can be undertaken with a linear equation system.

The unknown parameters are determined by the minimizing of the linearized cost function L. For this purpose, the cost function L is derived from the unknown parameters, and the following linear equation system is obtained:

$$\begin{bmatrix} A_{0,0} & A_{0,1} & A_{0,2} & A_{0,a}^{(b)} \\ A_{1,0} & A_{1,1} & A_{1,2} & A_{1,a}^{(b)} \\ A_{2,0} & A_{2,1} & A_{2,2} & A_{2,a}^{(b)} \\ A_{a,0}^{(b)} & A_{a,1}^{(b)} & A_{a,2}^{(b)} & A_{a,\mu}^{(b,\lambda)} \end{bmatrix} \cdot \begin{bmatrix} \Delta\hat{\omega} \\ \Delta\hat{\phi} \\ \hat{\epsilon} \\ \hat{g}_a^{(b)} \end{bmatrix} = \begin{bmatrix} b_0 \\ b_1 \\ b_2 \\ b_a^{(b)} \end{bmatrix} \quad (4)$$

If the linear equation system is solved, then the estimated values $\Delta\hat{\omega}$, $\Delta\hat{\phi}$, $\hat{\epsilon}$, and $\hat{g}_a^{(b)}$ of the unknown parameters become known.

Figure 3:
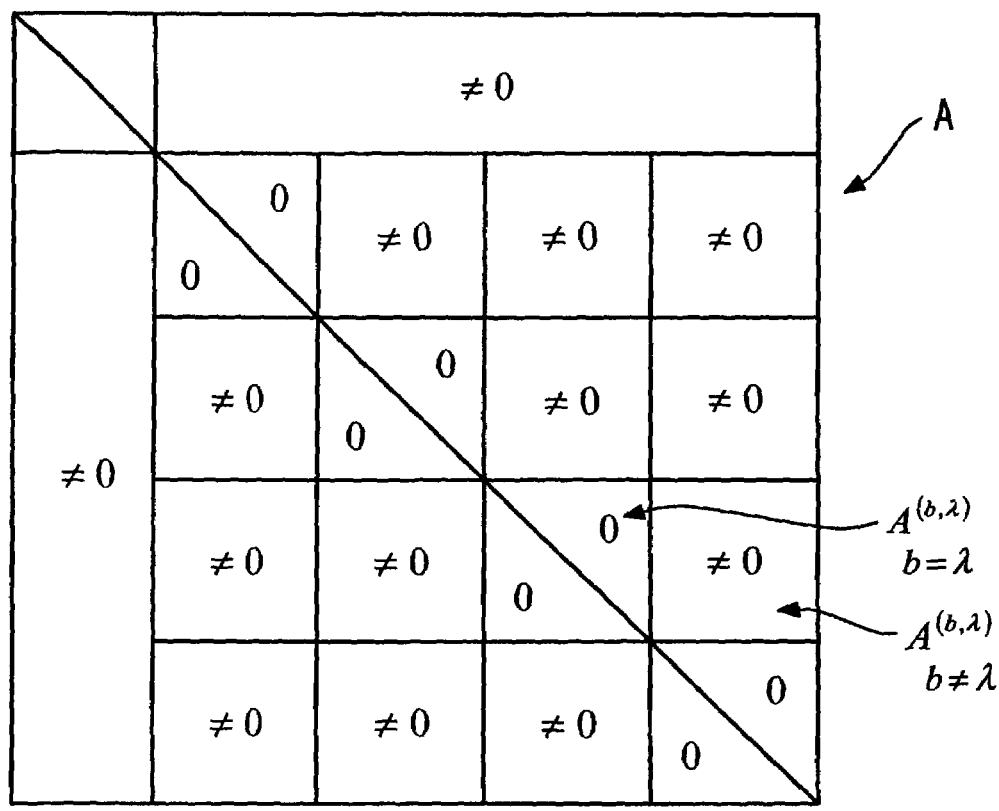

The structure of the matrix A is presented in FIG. 3. The first three rows of the matrix contain the influence of the offsets of time, frequency, and phase. The remaining rows comprise 16 sub-matrixes and contain the input of the amplification factors of the code channels from the various code sets. In an extreme case, in the CDMA2000 radio system, respectively, 256 code channels are available in 4 different code sets. The numerical complexity for the computation of the matrix coefficients $A_{a,\mu}^{(b,\lambda)}$ is also very high.

For the computation of the said matrix coefficients $A^{a,\mu(b,\lambda)}$ the partial derivatives of the linearized cost function must be calculated in accord with the amplification factors $\hat{g}_\phi^{(b)}$. For this purpose, the following formulation is applied:

An unknown parameter x is to be a real number, the constants $\alpha$ and $\beta$ are to be complex numbers and the cost function:

$$L=|\alpha\cdot x+\beta|^2=(\alpha\cdot x+\beta)\cdot(\alpha\cdot x+\beta)^*=|\alpha|^2\cdot x^2+\alpha^*\cdot\beta\cdot x+\alpha\cdot\beta^*\cdot x+|\beta|^2 \quad (5)$$

employs the square root of the amount. Then the partial derivative appears as $$\frac{\partial L}{\partial x} = 2 \cdot |\beta|^2 \cdot x + 2 \cdot \text{REAL}\{\alpha \cdot \beta^*\} \quad (6)$$

from which may be obtained the partial derivatives in accord with the amplification factors of the code channels a in the code sets b as:

$$\frac{\partial L}{\partial \hat{g}_a^{(b)}} = 2 \sum_{v=0}^{N-1} \left| s_a^{(b)}(v) \right|^2 \cdot \hat{g}_a^{(b)} + 2 \sum_{v=0}^{N-1} \text{REAL}\{-s_a^{(b)}(v) \cdot c^*(v)\} = 0 \quad (7)$$

with $c(v) = r(v) - jr(v) \cdot \Delta\hat{\omega} \cdot v - jr(v) \cdot \Delta\hat{\phi} - r'(v) \cdot \hat{\varepsilon} - \sum_{\lambda} \sum_{\mu \neq a} \hat{g}_\mu^{(\lambda)} s_\mu^{(\lambda)}(v)$ (8)

and from the equation (7) and the equation (8), the computation rule for the coefficients may be obtained, namely:

$$A_{a,\mu}^{(b,\lambda)} = \sum_v \text{REAL}\{s_a^{(b)}(v) \cdot [s_\mu^{(\lambda)}(v)]^*\} \quad (9)$$

wherein $^{desc}s_a^{(b)}(v)$ or $^{desc}s_\mu^{(\lambda)}(v)$ are respectively, the complex, capacity standardized, scrambled reference signals of the code channel a in the code set b, or those of the code channel λ in the code set μ.

The principal diagonal coefficients $A_{a,a}^{(b,b)}$ of the subordinate matrices are not equal to zero and the adjoining diagonal coefficients $A_{a,\mu}^{(b,b)}$ are, for μ≠μ, because of the orthogonality of the employed splitter code, zero. The coefficients $A_{a,\mu}^{(b,\lambda)}$ of the different subordinate matrices $A^{(b,\lambda)}$ are for b≠λ are not equal to zero because of the non-availability of the orthogonality of different scrambling codes from different code sets. This is depicted in FIG. 3.

The direct computation of the matrix coefficients $A_{a,\mu}^{(b,\lambda)}$ with the equation (9) is numerically very complex, since the correlation sums must be computed on the basis of the chip plane. A substantial reduction of the numeric complexity is reached, in accord with the invention, in that the correlation sums are computed on the symbol plane. For this purpose, in a first step, Equation (9) is formulated with unscrambled signals. This leads to:

$$A_{a,\mu}^{(b,\lambda)} = \sum_v \text{REAL}\{^{desc}s_a^{(b)}(v) \cdot scr^{(b)}(v) \cdot [scr^{(\lambda)}(v)]^* \cdot [^{desc}s_\mu^{(\lambda)}(v)]^*\} \text{ wherein } ^{desc}s_a^{(b)}(v) \text{ or } ^{desc}s_\mu^{(\lambda)}(v) \quad (10)$$

are the complex valued, capacity standardized, unscrambled reference signals of the code channel a in the code set b or, respectively, the code channel λ in code set μ.

For the computation of the matrix coefficients on the symbol plane, the scrambled chip signals of the code channels are replaced with symbol signals of the code channels and with the corresponding splitting codes of the code channels, whereupon follows:

$$A_{a,\mu}^{(b,\lambda)} = \text{REAL}\left\{\sum_{l_1} s_a^{(b)}(l_1) \cdot \sum_{l_2=0}^{\frac{SF_a^{(b)}}{SF_\mu^{(\lambda)}}-1} [s_\mu^{(\lambda)}(l_2)]^* \cdot \sum_{v=0}^{SF_\mu^{(\lambda)}-1} w_a^{(b)}\left(l_2 \frac{SF_a^{(b)}}{SF_\mu^{(\lambda)}} + v\right) \cdot w_\mu^{(\lambda)}(v) \cdot scr^{(b)}\left(l_1 SF_a^{(b)} + l_2 \frac{SF_a^{(b)}}{SF_\mu^{(\lambda)}} + v\right) \cdot \left[scr^{(\lambda)}\left(l_1 SF_a^{(b)} + l_2 \frac{SF_a^{(b)}}{SF_\mu^{(\lambda)}} + v\right)\right]^*\right\}$$

$$= \text{REAL}\left\{\sum_{l_1} s_a^{(b)}(l_1) \cdot \sum_{l_2=0}^{\frac{SF_a^{(b)}}{SF_\mu^{(\lambda)}}-1} [s_\mu^{(\lambda)}(l_2)]^* \cdot d(l_1, l_2, a, \mu, b, \lambda)\right\}. \quad (11)$$

Figure 4:
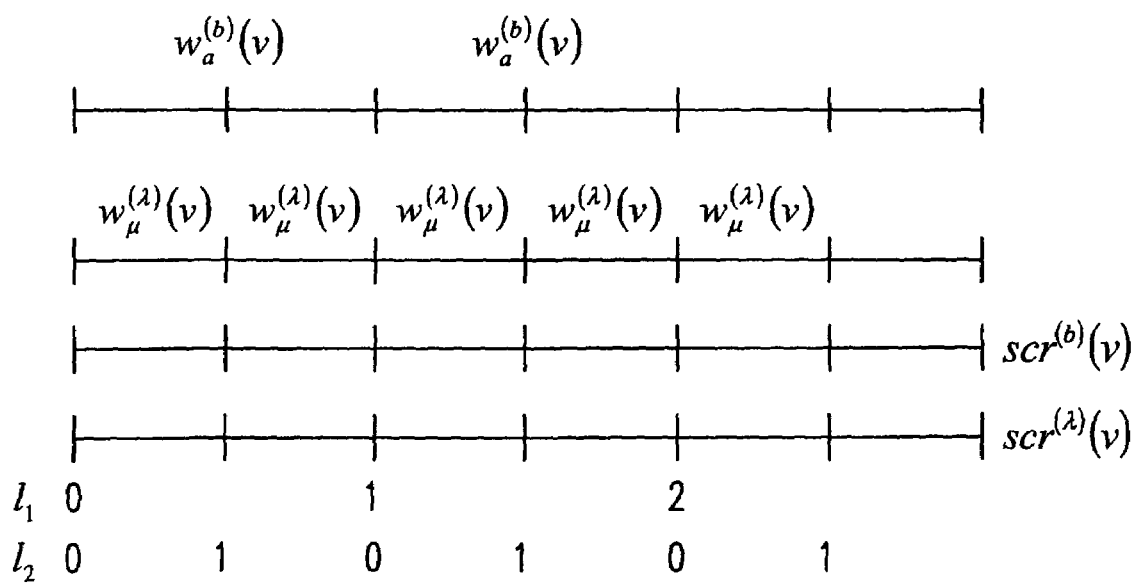

The intermediate values $$d(l_1, l_2, a, \mu, b, \lambda) = \sum_{v=0}^{SF_\mu^{(\lambda)}-1} w_a^{(b)}\left(l_2 \frac{SF_a^{(b)}}{SF_\mu^{(\lambda)}} + v\right) \cdot w_\mu^{(\lambda)}(v) \cdot scr^{(b)}\left(l_1 SF_a^{(b)} + l_2 \frac{SF_a^{(b)}}{SF_\mu^{(\lambda)}} + v\right) \cdot \left[scr^{(\lambda)}\left(l_1 SF_a^{(b)} + l_2 \frac{SF_a^{(b)}}{SF_\mu^{(\lambda)}} + v\right)\right]^*, \quad (12)$$

are obtained—as is evident in FIG. 4—from the undivided symbols of sections of the products of the scrambling codes.

The large $w_a^{(b)}(v)$ or $w_\mu^\lambda(v)$ are the splitting codes and the large $SF_a^{(b)}$ or $SF_\mu^\lambda$ are, respectively, the splitting factors of the splitting codes of the a-code channel in the b-code set or the μ-code channels in the λ code set. By means of this introduction of the invented procedure, it becomes obvious, without limitation, that the supposition may be made that $SF^{a(b)} \geq SF_\mu^{(\lambda)}$ is valid.

The two external sums in Equation (11) are in accord with the invention, only when calculated on the basis of the symbol plane. If the intermediate coefficients $d(l_1,l_2,a,\mu,b,\lambda)$ are known, then the numerical complexity for the computation is markedly reduced.

The intermediate coefficients $d(l_1,l_2,a,\mu,b,\lambda)$ can be a priori computed with equation 12 and saved in memory. The requirement for memory for this, is, in any case, high.

If the intermediate coefficients $d(l_1,l_2,a,\mu,b,\lambda)$ not be a priori computed due to limited memory capacity, then, these must be computed a posteriori. For this purpose, a numerically effective procedure can be applied, which is described in the following. In Equation (12) the sum of the elementary products of two splitting codes and two scrambling codes is calculated. The elementary product of two splitter codes out of the same code class is once again, one splitter code out of the code class. The coefficients from equation (12) permit themselves to be determined likewise numerically effective with a recombining operation.

If splitter codes emerge out of different code classes, then, the elementary products must be calculated from the shorter splitter code and an excerpt of the longer splitter code calculated. The excerpt of the longer splitter code is once again a splitter code, which, principally, is multiplied with the factor −1 or +1. The code class $$CC = \tilde{C}\tilde{C}_p^\lambda \quad (13)$$

of the splitter code represents the code class of the shorter splitter code and the code number calculates itself to give:

$$\tilde{C}\tilde{N}_a^{(b)} = REM\{CN_a^{(b)}, CC_\mu^{(\lambda)}\} \quad (14)$$

wherein the operator
  REM { ... }
calculates the integral remainder of the division.

As the next point, with connection of the elementary product of two splitter codes is to be derived. The elementary multiplication of two splitter codes from the same code class CC yields again a splitter code. The code number can be calculated as follows. In a first step, the code numbers of the codes, which are sorted in accord with the Hadamard arrangement, are to be transformed into code numbers which are sorted according to the Walsh arrangement.

This yields:

$$CN_{Walsh}^{(1)} = G^{-1}\{R\{\tilde{C}\tilde{N}_a^{(b)}\}\} \text{ and } CN_{Walsh}^{(2)} = G^{-1}\{R\{CN_\mu^{(\lambda)}\}\} \quad (15)$$

Subsequently the code number is added bitwise modulo 2, $$CN_{Walsh} = CN_{Walsh}^{(1)} \oplus CN_{Walsh}^{(2)} \quad (16)$$

and thereafter retro-transformed into a code number of the Hadamard arrangement $$CN = R\{G\{CN_{Walsh}\}\} \quad (17)$$

Herein, the R{x} is the bit-reverse operator and $$G(x) = \sum_{i=0}^{CC-1} (U_i \oplus U_{i+1}) \cdot 2^i \quad (18)$$

Wherein $U_1$ represents the bits of x:

$$x = \sum_{i=0}^{CC-1} U_i \cdot 2^i \quad (19)$$

The transposed function of G(x) shows itself in a bit-like appearance as:

$$U_i = \begin{cases} 1 & \text{for } \sum_{j=i}^{CC-1} V_j \text{ straight} \\ 0 & \text{otherwise} \end{cases} \quad (20)$$

whereby $V_1$ are the bits of G(x) and:

$$G(x) = \sum_{i=0}^{CC-1} V_i \cdot 2^i \quad (21)$$

With the transformulation of the elementary product of two splitter codes, the equation (21) simplifies itself to:

$$d(l_1, l_2, a, \lambda, b, \mu) = HADAMARD\left(\left\lfloor\frac{CN_a^{(b)}}{SF_\mu^{(\lambda)}}\right\rfloor, l_2\right) \cdot \sum_{v=0}^{SF_\mu^{(\lambda)}-1} w_{CC}^{CN}(v) \cdot$$
$$scr^{(b)}\left(l_1 SF_a^{(b)} + l_2 \frac{SF_a^{(b)}}{SF_\mu^{(\lambda)}} + v\right) \cdot$$
$$\left[scr^{(\lambda)}\left(l_1 SF_a^{(b)} + l_2 \frac{SF_a^{(b)}}{SF_\mu^{(\lambda)}} + v\right)\right]^*, \quad (22)$$

whereby, HADAMARD(y,x) of the coefficient in the y-row and the x-column is a Hadamard matrix of the order $$\frac{SF_a^b}{SF_\mu^\lambda}.$$

By means of a recombination operation, with the use of the Hadamard transformation, more intermediate value coefficients $d(l_1,l_2,a,\mu,b,\lambda)$ can be very effectively computed simultaneously.

For the definition of the concept "Hadamard Matrix" and the "Walsh Arrangement", refer to PH. W. Besslich and Tian Lu, "Diskreteorthogonaltransformationen", Springer Verlag, 1990.

As has already been mentioned, the invented procedure may be used not only with the mobile radio standard of CMDA2000, but also employed with other mobile radio standards, for instance, W-CDMA.

The invention claimed is:

1. A process for estimating amplification factors ($g_a^{(b)}$) of a received CDMA Signal (r(v)):
   (a) receiving a CDMA Signal (r(v)) having amplification factors ($g_a^{(b)}$) in a mobile radio system, said CDMA signal including a plurality of code channels, in which, respectively, an incoming signal ($s_a^{(b)}(l)$) of a symbol plane with a splitter code ($w_a^{(b)}(v)$) is split into a chip plane;
   (b) providing a cost function (L) dependent upon estimated values ($\hat{g}_a^{(b)}$) of all the amplification factors ($g_a^{(b)}$) of the received CDMA signal;
   (c) partially differentiating the cost function (L) according to the estimated value ($\hat{g}_a^{(b)}$) of the amplification factors ($g_a^{(b)}$) of the received CDMA signal;
   (d) forming a matrix-vector-equation based on all partial differentials of the cost function (L) being zero and thus presenting a minimum of the cost function;
   (e) determining at least some of the matrix coefficients ($A_{a,\mu}^{(b,\lambda)}$) of the matrix-vector-equation with a correlation function on the symbol plane at the mobile radio system to determine the estimated amplification factors ($g_a^{(b)}$); and
   (f) conveying the estimated amplification factors ($g_a^{(b)}$) for interpretation of the received CDMA signal (r(v)) by the mobile radio system.

2. The process of claim 1, wherein the computation of the matrix coefficients ($A_{a,\mu}^{(b,\lambda)}$) comprises applying a recombination operation to calculate intermediate coefficients ($d(l_1,l_2,a,\mu,b,\lambda)$).

3. The process of claim 1, wherein the CDMA signal is comprised of a plurality of code sets b each of which respectively encompasses several code channels a split by means of orthogonal splitter codes $w_a^{(b)}(v)$, whereby the code channels are scrambled with a uniform scrambling code $scr(b)(v)$ for all code channels a of a code set b, and wherein the matrix coefficients $A_{a,\mu}^{(b,\lambda)}$ are computed by means of the following equation:

$$A_{a,\mu}^{(b,\lambda)} = \text{REAL}\left\{ \sum_{l_1} s_a^{(b)}(l_1) \cdot \sum_{l_2=0}^{\frac{SF_a^{(b)}}{SF_\mu^{(\lambda)}}-1} \left[s_\mu^{(\lambda)}(l_2)\right]^* \cdot \right.$$

$$\sum_{v=0}^{SF_\mu^{(\lambda)}-1} w_a^{(b)}\!\left(l_2 \frac{SF_a^{(b)}}{SF_\mu^{(\lambda)}} + v\right) \cdot w_\mu^{(\lambda)}(v) \cdot$$

$$scr^{(b)}\!\left(l_1 SF_a^{(b)} + l_2 \frac{SF_a^{(b)}}{SF_\mu^{(\lambda)}} + v\right) \cdot$$

$$\left.\left[scr^{(\lambda)}\!\left(l_1 SF_a^{(b)} + l_2 \frac{SF_a^{(b)}}{SF_\mu^{(\lambda)}} + v\right)\right]^* \right\}$$

$$= \text{REAL}\left\{ \sum_{l_1} s_a^{(b)}(l_1) \cdot \sum_{l_2=0}^{\frac{SF_a^{(b)}}{SF_\mu^{(\lambda)}}-1} \left[s_\mu^{(\lambda)}(l_2)\right]^* \cdot d(l_1, l_2, a, \mu, b, \lambda) \right\}.$$

Wherein
- $v$ is a time index on the chip plane,
- $a$ is a number of a code channel,
- $b$ is a number of a code set,
- $d(l_1,l_2,a,\mu,b,\lambda)$ are intermediate coefficients
- $g_a^{(b)}$ is the amplification factor of the a-code channel in the b-code set.
- $l$ is a time index on the symbol plane,
- REAL { . . . } is a real-part operator,
- $s_a^{(b)}(v)$ is a standardized capacity, scrambled undistorted, reference signal of a-code channel in the b-code set
- $scr_a^{(b)}$ is the scrambling code of the b-code set, $SF_a^{(b)}$ is a splitting factor of the splitter code of the a-code channel in the b-code set, and
- $w_a^{(b)}(v)$ is the splitter code of the a-code channel in the b-code set.

4. The process of claim 3, wherein the intermediate coefficients $d(l_1,l_2,a,\mu,b,\lambda)$ are a priori computed and stored.

5. The process of claim 3, wherein the intermediate coefficients $d(l_1,l_2,a,\mu,b,\lambda)$ are computed a posteriori during the process by a recombination operation with a Hadamard Transformation.

6. The process of claim 5, wherein the intermediate coefficients $d(l_1,l_2,a,\mu,b,\lambda)$ are obtained through the equation:

$$d(l_1, l_2, a, \lambda, b, \mu) = \text{HADAMARD}\!\left(\left\lfloor \frac{CN_a^{(b)}}{SF_\mu^{(\lambda)}} \right\rfloor, l_2\right) \cdot \sum_{v=0}^{SF_\mu^{(\lambda)}-1} w_{CC}^{CN}(v) \cdot$$

$$scr^{(b)}\!\left(l_1 SF_a^{(b)} + l_2 \frac{SF_a^{(b)}}{SF_\mu^{(\lambda)}} + v\right) \cdot$$

$$\left[scr^{(\lambda)}\!\left(l_1 SF_a^{(b)} + l_2 \frac{SF_a^{(b)}}{SF_\mu^{(\lambda)}} + v\right)\right]^*,$$

HADAMARD(y,x) is the coefficient in the y-row and the x-column of a Hadamard matrix in the order of $$\frac{SF_a^{(b)}}{SF_\mu^{(\lambda)}},$$

- CC is the code class of a splitter code,
- CN is the code number of a splitter code, and
- $w_{CC}^{CN}(v)$ is the splitter code in the code class CC with the code number CN.

7. A computer readable medium comprising a computer program with a program code having instructions stored thereon for executing the process of claim 1 when the program is carried out in a computer or digital signal processor.

8. A digital storage medium having a program encoded thereon with instructions executed by a computer or a digital signal processor to perform the process of claim 1.

* * * * *